(12) United States Patent
Tanaka et al.

(10) Patent No.: US 8,297,599 B2
(45) Date of Patent: Oct. 30, 2012

(54) UNDERWATER AERATION DEVICE

(75) Inventors: Hiroyuki Tanaka, Osaka (JP); Satoshi Matsumoto, Osaka (JP)

(73) Assignee: Tsurumi Manufacturing Co., Ltd., Osaka (JP)

( * ) Notice: Subject to any disclaimer, the term of this patent is extended or adjusted under 35 U.S.C. 154(b) by 394 days.

(21) Appl. No.: 12/734,146

(22) PCT Filed: Sep. 2, 2008

(86) PCT No.: PCT/JP2008/065725
§ 371 (c)(1),
(2), (4) Date: Apr. 14, 2010

(87) PCT Pub. No.: WO2009/050950
PCT Pub. Date: Apr. 23, 2009

(65) Prior Publication Data
US 2010/0207285 A1    Aug. 19, 2010

(30) Foreign Application Priority Data

Oct. 17, 2007  (JP) .................................. 2007-269711

(51) Int. Cl.
*B01F 3/04*    (2006.01)
(52) U.S. Cl. ......................................................... 261/93
(58) Field of Classification Search ................... 261/84, 261/91, 93
See application file for complete search history.

(56) References Cited

U.S. PATENT DOCUMENTS

| | | | | |
|---|---|---|---|---|
| 1,526,596 A * | 2/1925 | Greenawalt | ...................... | 261/93 |
| 4,242,289 A * | 12/1980 | Blum | .............................. | 261/93 |
| 4,265,739 A * | 5/1981 | Dalton | .......................... | 209/169 |
| 4,696,417 A * | 9/1987 | Ugolini | ........................ | 222/146.6 |
| 5,356,570 A * | 10/1994 | Golob et al. | ..................... | 261/93 |
| 5,458,816 A * | 10/1995 | Ebner et al. | ................... | 261/64.1 |
| 5,762,833 A * | 6/1998 | Gross et al. | ....................... | 261/93 |
| 6,394,430 B1 * | 5/2002 | Forschner et al. | ............... | 261/87 |
| 6,736,377 B1 * | 5/2004 | Chien | .............................. | 261/93 |
| 7,980,824 B2 * | 7/2011 | Niitti | .............................. | 416/185 |

FOREIGN PATENT DOCUMENTS

| | | |
|---|---|---|
| JP | 54063542 | 5/1979 |
| JP | 54065563 | 5/1979 |
| JP | 54156207 | 12/1979 |
| JP | 58186898 | 12/1983 |
| JP | 61004720 | 2/1986 |

(Continued)

*Primary Examiner* — Charles Bushey
(74) *Attorney, Agent, or Firm* — Michael Tobias

(57) ABSTRACT

A submersible aerator has an impeller which includes blades having partition walls which separate liquid passages and air passages and which is accommodated within a guide casing for rotation between a lower surface of an intermediate plate having an air suction opening and an upper surface of a suction cover having a liquid suction opening. The liquid passages and the air passages meet through communication portions at radially outer ends of rear-side blade partition walls. Intermediate blades are provided at radially outer ends of the liquid passages. A conical space is defined between the blade lower end surfaces and the suction cover upper surface such that the space, which is wide at a portion adjacent to the liquid suction opening, becomes narrower toward a radially outward region including guide vane tongues. A plurality of support legs and a plurality of straining projections are integrally formed on the lower surface of a peripheral portion of a bottom wall of the guide casing. Sloping surfaces are provided on the top wall upper surface between air-liquid discharge passages such that the sloping surfaces are inclined downward and increase in width in the radially outward direction.

5 Claims, 5 Drawing Sheets

ROTATIONAL DIRECTION OF IMPELLER

FOREIGN PATENT DOCUMENTS

| | | |
|---|---|---|
| JP | 07155786 | 6/1995 |
| JP | 8-257586 * | 10/1996 |
| JP | 08252443 | 10/1996 |
| JP | 08323385 | 12/1996 |
| JP | 2003236357 | 8/2003 |
| JP | 2004188259 | 7/2004 |

* cited by examiner

ROTATIONAL DIRECTION OF IMPELLER

UNDERWATER AERATION DEVICE

TECHNICAL FIELD

The present invention relates to an underwater aeration device (hereinafter referred to as a "submersible aerator") which is placed in an aeration tank for processing industrial wastewater or wastewater from a city sewer.

BACKGROUND ART

There has been known a submersible aerator in which, by means of a negative-pressure self-suction action of an impeller rotating within a liquid storage tank, the impeller draws air from the atmosphere via an air conduit, draws wastewater that flows into the tank (hereinafter referred to as "liquid to be processed"), mixes it with the suctioned air, and jets the air-liquid mixture within the tank to thereby cause an aeration action. The impeller has a special structure, i.e., it includes air suction passages for drawing air and liquid suction passages for drawing the liquid to be processed. With the expectation that large solid materials that have entered within wastewater will be removed by means of a screen facility provided upstream of the liquid storage tank, the conventional submersible aerator is not provided with a strainer or similar member having a function of removing such foreign materials (hereinafter referred to as "foreign objects") which cannot be removed by the screen facility. In order to address problems of a submersible aerator caused by suction of foreign objects, a detaching mechanism (see, for example, Patent Document 1) or a cutting mechanism for cutting foreign objects (see, for example, Patent Document 2) is provided.

Patent Document 1: Japanese Patent Application Laid-Open (kokai) No. S54-063542 (FIGS. 1 to 5)
Patent Document 2: Japanese Utility Model Publication (kokoku) No. S61-004720 (FIGS. 1 to 4)

DISCLOSURE OF THE INVENTION

Problems to be Solved by the Invention

However, the aerators disclosed in Patent Documents 1 and 2 use an impeller having a special structure as described above, and they therefore have the following problems. As shown in FIGS. 1 and 2 of Patent Document 1 and FIGS. 1 to 4 of Patent Document 2, a partition wall for separating air passages and liquid passages from each other extends to the peripheral edge of the impeller, and the outlets of the air passages and the liquid passages are open and communicate with each other at the peripheral edge of the impeller. At the time of startup, a centrifugal force is generated as a result of rotation of the impeller, and a jet suction force is generated through jetting of liquid from the outlets of the liquid passages of the impeller at the peripheral edge thereof so as to discharge the liquid to be processed remaining in the air suction pathway (an air conduit and an air chamber) and the air passages of the impeller. When the impeller is rotated in a completely immersed state, a large amount of power is consumed, and the impeller load becomes large. Therefore, in order to cope with the large load at the time of startup, it is necessary to use a motor having a large number of poles or a high output power, or to perform a slow start through rotational speed control by making use of an inverter or the like. Alternatively, the aerator must be started after the liquid to be processed remaining within the air suction pathway is forcedly discharged by means of feeding air from the end of the air conduit. In either case, the size and cost of the facility increase. Furthermore, since the width and height of the air passages are constant from the radially inner ends to openings at the radially outer ends thereof, the air passages each have a constant cross-sectional area from the radially inner ends to the openings at the radially outer ends, so the following problem may arise. When the aerator is stopped, the liquid to be processed flows backwards into the space within the air suction pathway due to the pressure of water corresponding to the water depth at the installation site, and a plurality of foreign objects remain within the air passages. Therefore, at the time of restart, a long time is needed so as to completely discharge the liquid to be processed remaining within the air passages. Furthermore, since the plurality of foreign objects become entangled with one another, the foreign objects cannot be discharged smoothly, and the possibility of the air passage being clogged by the foreign objects is high.

In the case of a submersible aerator provided with an attachment/detachment mechanism, a problem arises in that every time foreign objects become entangled with the impeller to thereby impede rotation of the impeller or clog the liquid passages or air passages of the impeller, cumbersome work must be performed; that is, the submersible aerator must be lifted out of the wastewater by use of the attachment/detachment mechanism, and the foreign objects must be removed from the impeller. In the case of a submersible aerator provided with a cutting mechanism, entanglement of foreign objects with the impeller can be avoided. However, since the cutting mechanism considerably reduces the suction area of the liquid suction opening of the submersible aerator, the liquid to be processed can be drawn only at a low rate, so the flow rate of the liquid to be processed which is discharged from the impeller decreases. Accordingly, the rate at which air is drawn decreases, so the air-liquid mixing action and the stirring action by the jetted liquid naturally decrease. In addition, a motor of a large torque, e.g., a motor having a larger number of poles or a larger output power must be used in order to provide power needed for the cutting operation.

Moreover, the submersible aerators disclosed in Patent Documents 1 and 2 have the following problems associated with maintenance. That is, in the case of the submersible aerator disclosed in Patent Document 1, as shown in FIGS. 1 and 2 thereof, foreign objects become entangled with engagement members 12, 12' projecting from the outer circumference of the apparatus and the upper surface of the top wall of an air passage (which corresponds to an air chamber) 13. In the case of the submersible aerator disclosed in Patent Document 2, the submersible aerator is lifted out of the water in a state in which the liquid to be processed remains in recesses in the upper surfaces of the top walls of an air chamber and an oil chamber as shown in FIG. 1 thereof, and in which foreign objects are entangled with the upper surfaces. Therefore, an operator must perform cumbersome work, i.e., he must remove the remaining liquid to be processed and/or foreign objects in order to prevent the work site from becoming dirty.

An object of the present invention is to solve the above-described problems and to provide a submersible aerator which provides the following effects.

The submersible aerator can quickly discharge liquid to be processed remaining in an air suction pathway (i.e., an air conduit and an air chamber) and air passages of an impeller at the time of startup to thereby reduce the load at the time of startup and prevent clogging of the air passages by foreign objects.

The submersible aerator can prevent large foreign objects from being drawn into a liquid suction opening during operation without deteriorating its aeration action and can smoothly expel from the aerator foreign objects that have entered through the liquid suction port along with the liquid to be processed without cutting them and without allowing entanglement with the impeller.

When the submersible aerator is lifted out of the water for maintenance, foreign objects adhering to the surface of the submersible aerator fall off quite easily because of a downward flow of the liquid to be processed that occurs on the surface of the aerator when the aerator is lifted up.

Since the submersible aerator can provide an improved aeration action compared with conventional apparatuses, maintenance work can be reduced, and production costs and running costs can be lowered.

Means for Solving the Problems

The present invention provides a submersible aerator in which a boss portion of an impeller is attached to an end of a motor shaft extending downward from a motor and penetrates into an air chamber; an intermediate plate having an air suction opening at the center thereof is attached to a top wall of a guide casing such that the intermediate plate faces an upper surface of a peripheral portion of a circular main plate of the impeller extending radially outward from the boss portion; a suction cover having a liquid suction opening at the center thereof is attached to a bottom wall of the guide casing such that the suction cover faces lower end surfaces of blades of the impeller; a plurality of guide vanes are provided on an upper surface of the suction cover such that a clearance is left between the guide vanes and a peripheral edge of the impeller; guide passages defined between the guide vanes guide an air-liquid mixture discharged from the impeller to air-liquid discharge passages of the guide casing, whereby the air-liquid mixture is jetted outward through the air-liquid discharge passages; in order to introduce air from the atmosphere above a liquid into which the guide casing is immersed, an air chamber communicating with an air conduit extending downward from the atmosphere above the liquid is provided above the guide casing; the impeller, which is rotated by the motor, is accommodated within the guide casing such that the impeller can rotate between a lower surface of the intermediate plate and the upper surface of the suction cover; the plurality of blades are provided on the main plate of the impeller such that the blades project toward the upper surface of the suction cover with a predetermined clearance left therebetween, and radially inner ends of the blades face the liquid suction opening, whereby liquid passages are provided between the blades such that the liquid passages communicate with the liquid suction opening and extend radially outward; a groove is provided in each blade such that the groove extends from the periphery of the boss portion of the impeller toward the periphery of the impeller so as to define air passages which communicate with the air chamber, extend radially outward, and are open at radially outer ends thereof; the blades have partition walls which separate the liquid passages and the air passages from each other; and the liquid passages and the air passages meet through communication portions at the radially outer ends of rear-side blade partition walls, which are partition walls of the blades which are located rearward with respect to the rotational direction of the motor and which do not receive pressure. Furthermore, adjacent to the communication portions, which connect the liquid passages and the air passages at the radially outer ends of the rear-side blade partition walls of the impeller, intermediate blades project from the main plate such that the intermediate blades extend radially inward from the radially outer edge of the impeller so as to divide each liquid passage into two, the intermediate blades having a height smaller than a height of the blades; the radius of an imaginary circle which connects the radially inner ends of the lower end surfaces of the intermediate blades is equal to or less than the radius of an imaginary circle which connects the radially outer ends of the rear-side blade partition walls where the communication portions are provided; the radially inner edges of the intermediate blades are gently inclined such that the radius of an imaginary conical surface connecting the radially inner edges of the intermediate blades decreases gradually toward the lower surface of the main plate; and an attachment angle of the intermediate blades is determined such that the intermediate blades become substantially parallel to front-side blade partition walls, which are partition walls of the blades which are located frontward with respect to the rotational direction of the motor and which receive pressure. Moreover, a conical space is defined between the lower end surfaces of the blades of the impeller and the upper surface of the suction cover, which faces the lower end surfaces, such that the vertical dimension of the space, which is relatively large at an inlet portion adjacent to the liquid suction opening, decreases gradually toward a radially outward region including the radially inner ends of the guide vanes.

In the submersible aerator according to the present invention, on the lower surface of a peripheral portion of a bottom wall of the guide casing, a plurality of support legs are provided so as to support the weight of the submersible aerator and enable stable installation, and a plurality of straining projections are provided so as to define straining grooves which have a width which increases downward and which remove foreign objects which would otherwise be drawn into the liquid suction opening; the lower end surfaces of the straining projections are located above the lower end surfaces of the support legs so that when the submersible aerator is placed on an installation surface, the lower end surfaces of the straining projections do not come into contact with the installation surface and a clearance is left between the lower end surfaces of the straining projections and the installation surface; and the support legs and the straining projections are integrally formed on the lower surface of the peripheral portion of the bottom wall of the guide casing. Sloping surfaces are provided on an upper surface of the top wall of the guide casing such that the sloping surfaces are located between the air-liquid discharge passages and such that the sloping surfaces are inclined downward and increase in width from radially inner ends toward radially outer ends thereof.

Effects of the Invention

According to the submersible aerator of the present invention, the liquid passages and the air passages meet at the radially outer ends of the rear-side blade partition walls, at which the circumferential speed of the impeller becomes a maximum and the maximum negative pressure is produced. Therefore, in addition to a centrifugal force generated as a result of rotation of the impeller and a jet suction force generated by means of jetting of liquid from the outlets of the liquid passages of the impeller at the peripheral edge thereof, which forces are generated in conventional submersible aerators, a suction force generated by the maximum negative pressure, which is not generated in conventional submersible aerators, is used so as to discharge the liquid from the air passages. Therefore, the suction and discharge action of the air passages can be improved drastically. Furthermore, the cross-sectional area through which the liquid is discharged from each air passage is the sum of the cross-sectional area of the outlet of the air passage and the opening area of the communication portion at the radially outer end of the corresponding rear-side blade partition wall. Therefore, a considerable cross-sectional area is obtained for liquid discharge compared with the cross-sectional area of each air passage. In addition, discharge of the liquid starts at a radial position which is radially inward of the conventional liquid discharge starting point. The liquid to be processed and foreign objects remaining in the air passages at the time of startup can be drawn and discharged very quickly and smoothly, whereby the load at startup can be lowered, and clogging by foreign objects can be prevented. In addition, since the air suction performance in an ordinary operating state after startup is improved, efficient aeration can be effected by means of an air-liquid mixture containing a large amount of air. Moreover, in the case where the amount of aspirated air is considerably increased by establishing communication between a liquid passage and a corresponding air passage via a communication portion at the radially outer end of a corresponding rear-side blade partition wall, an air-liquid mixture which includes an excessive amount of aspirated air, which is low in density and which is unstable (hereinafter referred to as an "unstable air-liquid mixture") hits the outer circumferential surface of a subsequent blade. As a result of rotation of the impeller, kinetic energy is imparted to the unstable air-liquid mixture from the blade surface, so that the jet from the outlet of the corresponding liquid passage naturally becomes unstable, and the air suction performance fluctuates accordingly. In order to avoid such instability, intermediate blades are provided within the liquid passages. By means of a shielding and guiding action of the intermediate blades, the subsequent blade surface is prevented from acting on the unstable air-liquid mixture. Thus, within a liquid passage provided between the back surface of each intermediate blade and the subsequent blade surface, the subsequent blade surface imparts a proper kinetic energy to the liquid which is stable in terms of density. Furthermore, a sufficient jet suction force is generated by stable jetting from the outlets of the liquid passages, and in two liquid passages provided through division of each liquid passage by an intermediate blade, a centrifugal force generated by rotation of the impeller acts on the liquid to be processed normally drawn from the liquid suction opening to the liquid passages. Since this centrifugal force also acts on the unstable air-liquid mixture in each liquid passage defined between the surface of each intermediate blade and the back surface of a corresponding proceeding blade, the unstable air-liquid mixture is pushed outward from the outlet of the liquid passage so that the suction force is properly generated due to the maximum negative pressure in a continuous range starting at the communication portion at the radially outer end of each rear-side blade partition wall. A second effect achieved through provision of the intermediate blades is as follows. When the impeller is rotated, in a clearance between the peripheral edge of the impeller and the radially inner edges of the guide vanes, the guide vane tongues face the radially outer ends of the intermediate blades as well as the radially outer ends of the partition wall of each blade which receives pressure. As a result, in the clearance at the peripheral edge of the impeller, the air-liquid mixture comes into frictional engagement with the guide vane tongues an increased number of times per rotation, thereby promoting breaking of air bubbles by shearing force, so that air bubbles within the air-liquid mixture are divided more finely. Accordingly, an aeration process which attains a considerably higher aeration efficiency compared with that attained by conventional apparatuses can be performed. Moreover, a conical space is defined between the blade lower end surfaces of the impeller and the suction cover upper surface such that the vertical dimension of the space, which is relatively large at an inlet portion adjacent to the liquid suction opening, decreases gradually toward a radially outward region including the radially inner ends of the guide vanes. Therefore, by means of a guide action which is small in fluid loss, closing of the clearance under the blade lower end surfaces by foreign objects can be prevented without causing considerable deterioration of the liquid suction performance. Furthermore, since the opening areas of the radially inner ends of the guide passages between the guide vane tongues can be made large, the foreign objects are smoothly discharged, together with the air-liquid mixture, from the radially outward openings of the air-liquid discharge passages without causing clogging of the guide passages and the air-liquid discharge passages by foreign objects. Furthermore, the above-described effective aeration action is performed, and production costs and running costs can be reduced.

Furthermore, the plurality of support legs for supporting the weight of the submersible aerator and enabling stable installation and the plurality of straining projections for defining straining grooves having a width which increases downward and which remove foreign objects which would otherwise be drawn into the liquid suction opening are integrally formed on the lower surface of the peripheral portion of the bottom wall of the guide casing. Therefore, the number of assembly steps and the number of fastening components naturally decrease, whereby production costs can be lowered. Since the submersible aerator comes into point contact with an installation surface through the limited contact areas of the lower ends of the support legs, even when the installation surface includes some projections and depressions, the submersible aerator comes into contact with the installation surface at least three points, so the submersible aerator can be installed in a stable condition. In addition, since large foreign objects are not drawn into the liquid suction opening, stable operation which is free from problems such as clogging by foreign objects can be realized. Furthermore, the support legs and the straining projections are tapered such that their widths decrease downward, and sloping surfaces are provided on the upper surface of the top wall of the guide casing between the air-liquid discharge passages such that the sloping surfaces are inclined downward and the width thereof increases from the radially inner ends toward the radially outer ends thereof. Therefore, when the submersible aerator is lifted out of the water for maintenance, foreign objects adhering to the surface of the submersible aerator fall off quite easily without becoming entangled therewith by virtue of a downward flow of the liquid to be processed on the surface of the aerator being lifted up. Accordingly, maintenance work can be reduced without dirtying the work site.

BEST MODE FOR CARRYING OUT THE INVENTION

An embodiment of a submersible aerator according to the present invention will be described in detail by way of example, with reference to the accompanying drawings, i.e., FIGS. 1 to 5.

Embodiment 1

Figure 1:
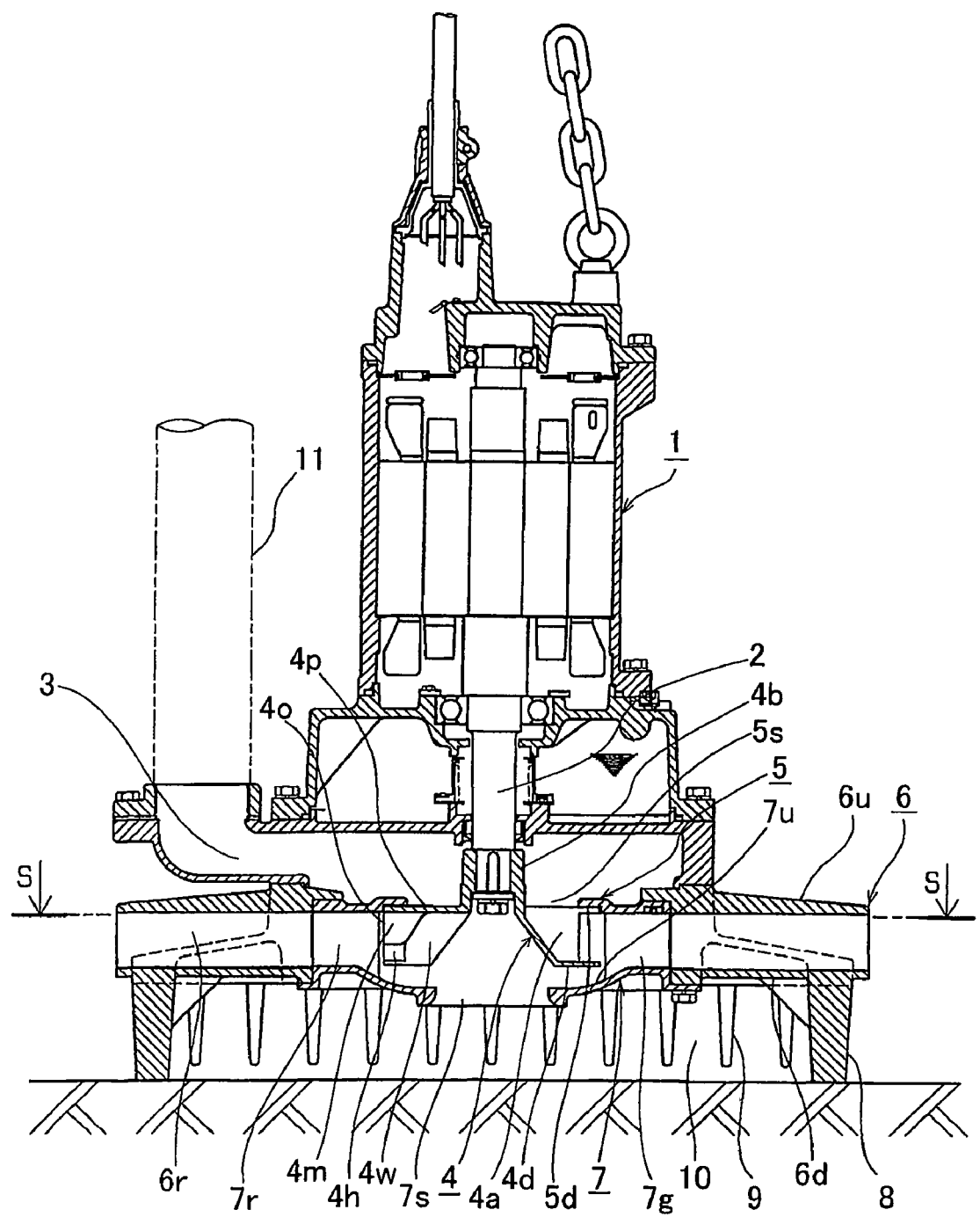
FIG. 1 is a vertical sectional view showing the structure of a submersible aerator according to the present invention.
Figure 2:
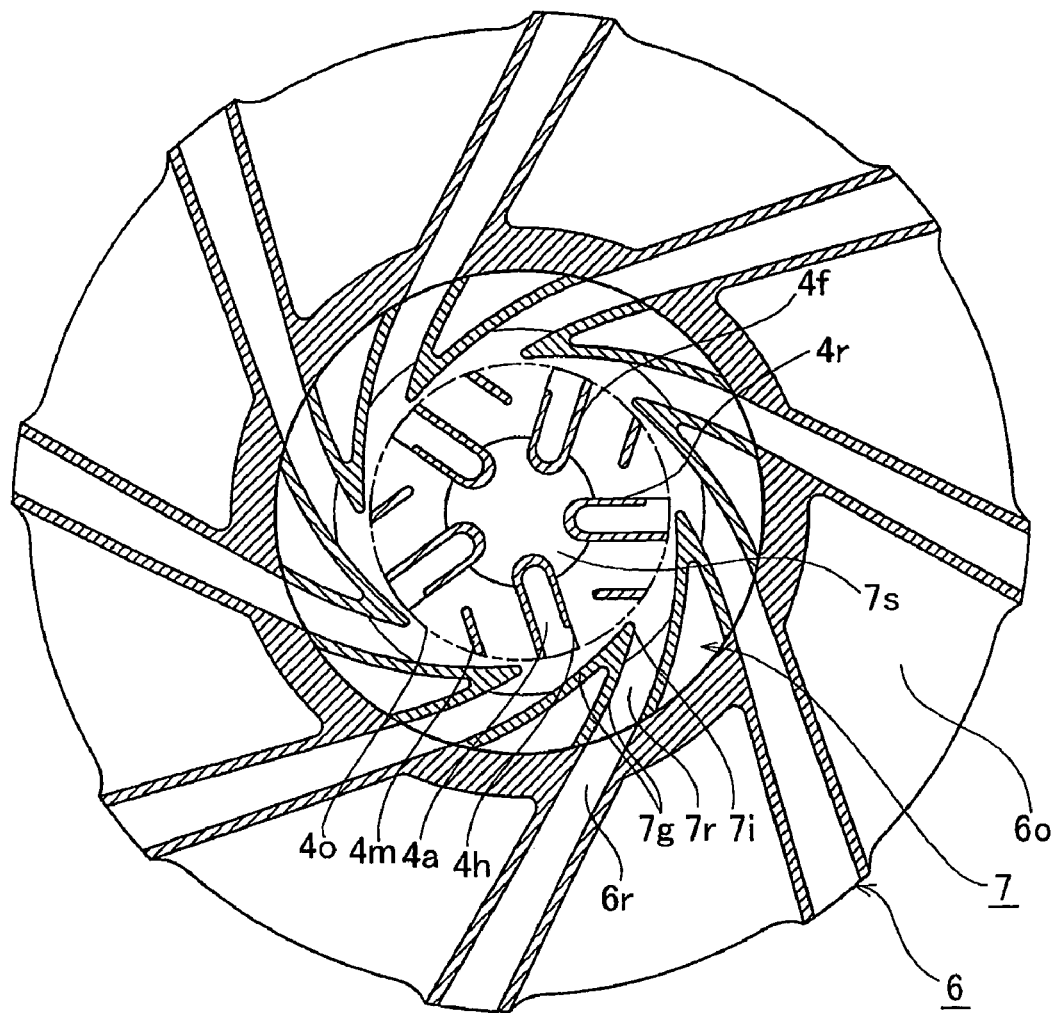
FIG. 2 is a transverse sectional view taken along line S-S of FIG. 1.
Figure 2:
Figure 3:
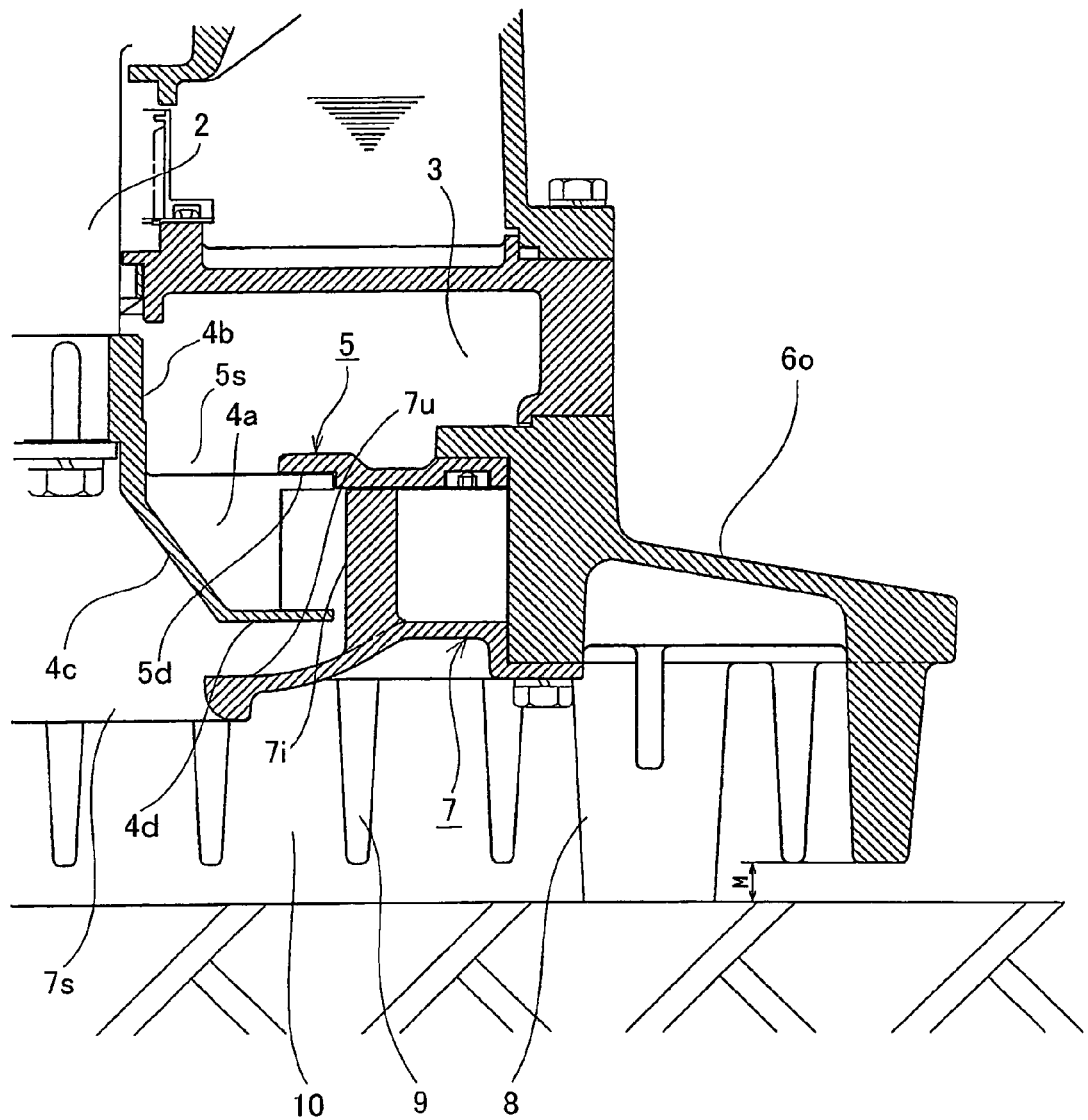
FIG. 3 is an enlarged vertical sectional view of a main portion of the submersible aerator according to the present invention, showing the shape of the top surface of a top wall between air-liquid discharge passages of a guide casing.
Figure 4:
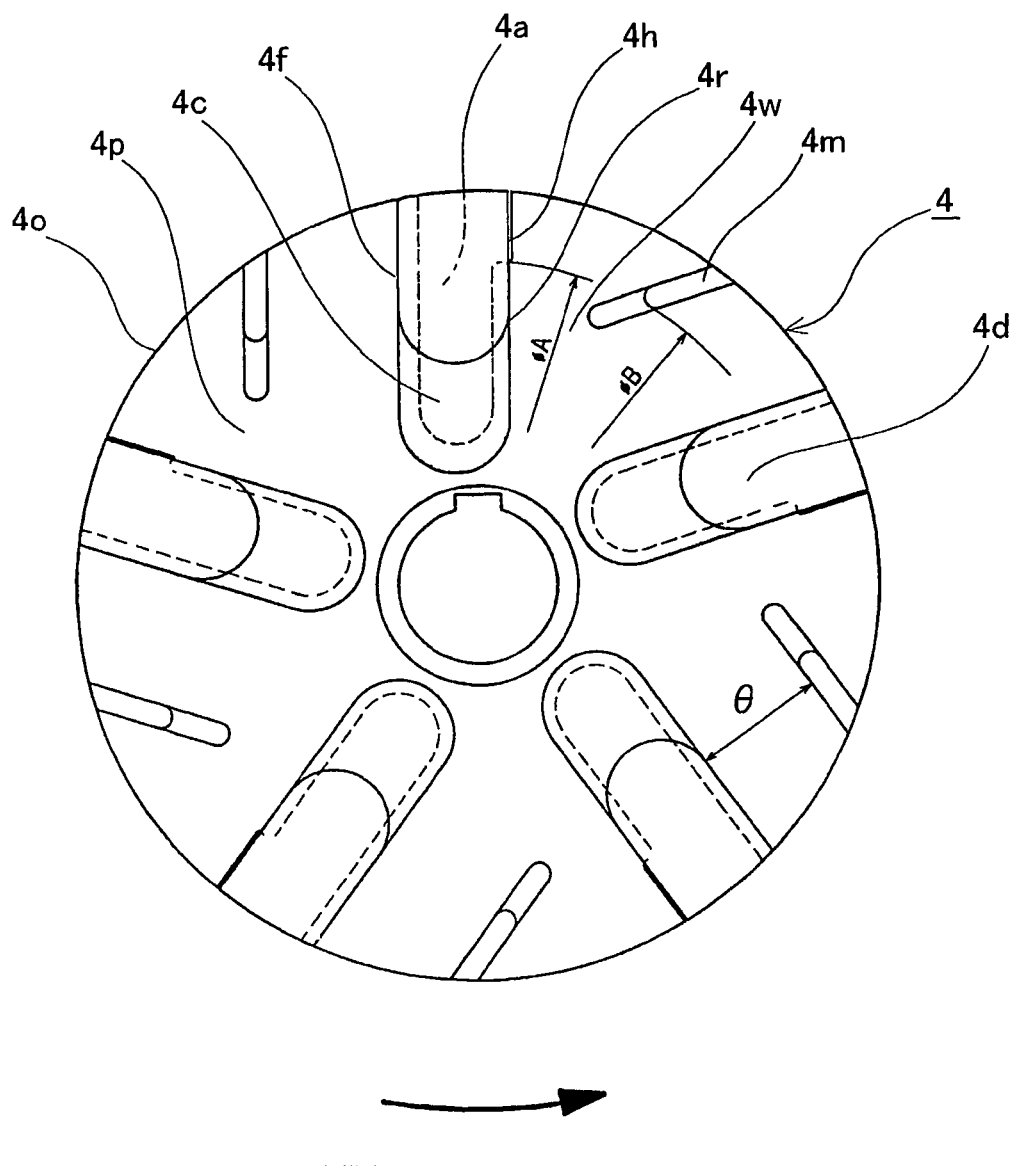
FIG. 4 is an explanatory plan view of an impeller of the submersible aerator according to the present invention, showing the configurations of liquid passages, air passages, and intermediate blades of the impeller.
Figure 5:
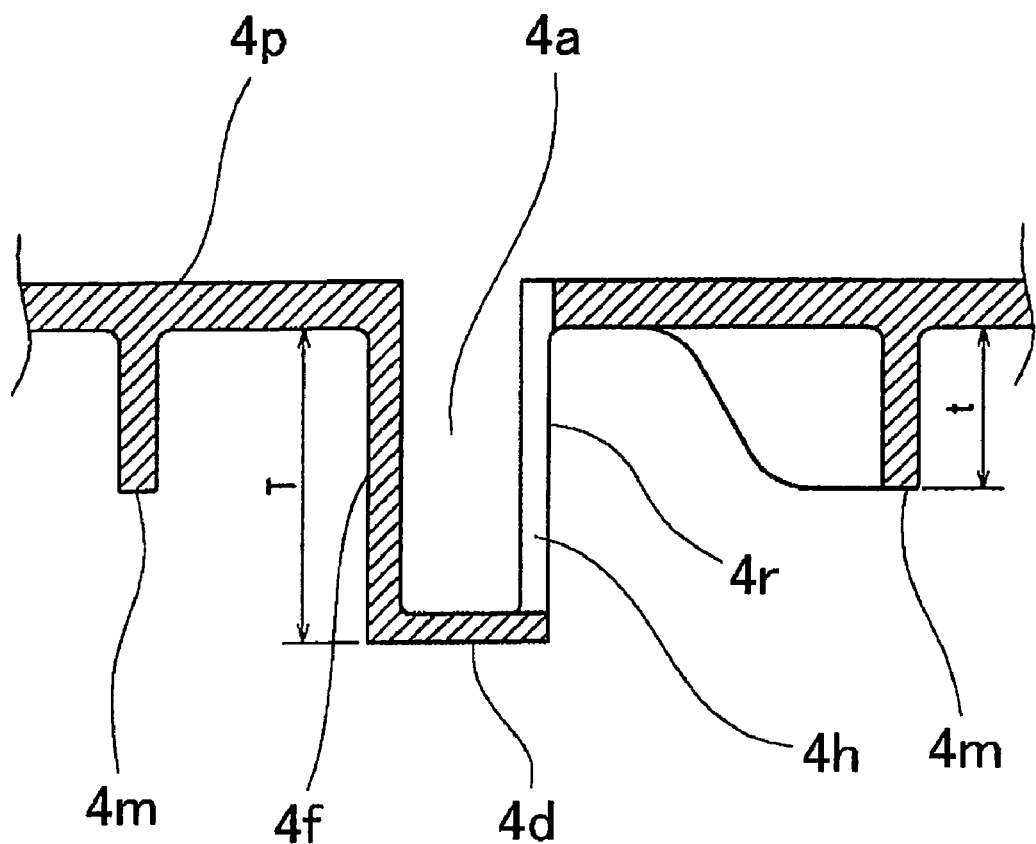
FIG. 5 is a vertical sectional view of a main portion of the impeller of the submersible aerator according to the present invention, showing the cross-sectional shape of an air passage of the impeller.

In FIGS. 1 to 3, reference numeral 1 denotes a motor for driving a submersible aerator, and 2 denotes a motor shaft which extends downward from the motor 1 and penetrates into an air chamber 3. A boss portion 4b of an impeller 4 is fitted onto the end of the motor shaft 2. The impeller 4 includes a circular main plate 4p extending radially outward from the boss portion 4b. An intermediate plate 5 having an air suction opening 5s at the center thereof is attached to a top wall 6u of a guide casing 6 such that the intermediate plate 5 faces an upper surface of a peripheral portion of the main plate 4p. A suction cover 7 having a liquid suction opening 7s at the center thereof is attached to a bottom wall 6d of the guide casing 6 such that the suction cover 7 faces the lower end surfaces 4d of blades 4c of the impeller 4. A plurality of guide vanes 7g are provided on an upper surface 7u of the suction cover 7 such that a clearance is left between the guide vanes 7g and a peripheral edge 4o of the impeller 4. Preferably, radially inner ends of the guide vanes 7g serve as guide vane tongues 7i, and the guide vanes 7g individually have a V-like shape such that the distance between portions of each guide vane corresponding to the two legs of the letter "V" increases in the radially outward direction. Guide passages 7r defined between the guide vanes 7g guide an air-liquid mixture discharged from the impeller 4 to air-liquid discharge passages 6r of the guide casing 6, whereby the air-liquid mixture is jetted outward through the air-liquid discharge passages 6r. In order to introduce air from the atmosphere above a liquid into which the guide casing 6 is immersed, the air chamber 3 is provided above the guide casing 6. The air chamber 3 communicates with an air conduit 11 extending downward from the atmosphere above the liquid. The impeller 4, which is rotated by the motor 1, is accommodated within the guide casing 6 such that the impeller 4 can rotate between a lower surface 5d of the intermediate plate 5 and the upper surface 7u of the suction cover 7. The plurality of blades 4c are provided on the main plate 4p of the impeller 4 such that the blades 4c project toward the upper surface 7u of the suction cover 7 with a predetermined clearance left therebetween, and the radially inner ends of the blades 4c face the liquid suction opening 7s. Liquid passages 4w are defined between the blades 4c such that the liquid passages 4w communicate with the liquid suction opening 7s and extend radially outward. A groove is provided in each blade 4c such that the groove extends from the periphery of the boss portion 4b of the impeller 4 toward the periphery of the impeller 4 so as to define air passages 4a which communicate with the air chamber 3 and extend radially outward. The blades 4c have partition walls which separate the liquid passages 4w and the air passages 4a from each other. One partition wall of each blade 4c which is located to the rear with respect to the rotational direction of the motor 1 and which does not receive pressure will be referred to as the "rear-side blade partition wall 4r." The other partition wall of each blade 4c which is located to front with respect to the rotational direction of the motor 1 and which receives pressure will be referred to as the "front-side blade partition wall 4f." The liquid passages 4w and the air passages 4a meet through communication portions 4h at the radially outer ends of the rear-side blade partition walls 4r, where the circumferential speed of the impeller becomes a maximum and the maximum negative pressure is produced. Notably, although the communication portions 4h may be communication holes, preferably, the communication portions 4h assume the form of cutouts. As shown in FIGS. 4 and 5, intermediate blades 4m are provided adjacent to the communication portions 4h, which connect the liquid passages 4w and the air passages 4a at the radially outer ends of the rear-side blade partition walls 4r. The intermediate blades 4m project from the main plate 4p such that they extend radially inward from the radially outer edge of the impeller 4 so as to divide each liquid passage 4w in two. The intermediate blades 4m have a height t which is smaller than the blade height T and which is preferably about half the blade height T. The radius φB of an imaginary circle which connects the radially inner ends of the lower end surfaces of the intermediate blades 4m is equal to or less than the radius φA of an imaginary circle which connects the radially outer ends of the rear-side blade partition walls 4r where the communication portions 4h are provided. The radially inner edges of the intermediate blades 4m are gently inclined such that the radius of an imaginary conical surface connecting the radially inner edges of the intermediate blades 4m decreases gradually toward the lower surface of the main plate 4p. The attachment angle θ of the intermediate blades 4m is determined such that the intermediate blades 4m become substantially parallel to the front-side blade partition walls 4f. Moreover, as shown in FIGS. 1 and 3, a conical space is defined between the blade lower end surfaces 4d of the impeller 4 and the suction cover upper surface 7u, which faces the lower end surfaces 4d. The vertical dimension of the space, which is relatively large at an inlet portion adjacent to the liquid suction opening 7s, gradually decreases toward a radially outward region including the radially inner ends of the guide vanes 7g.

As shown in FIGS. 1 to 3, a plurality of support legs 8 are provided on the lower surface of a peripheral portion of the bottom wall 6d of the guide casing 6 so as to support the weight of the submersible aerator and enable stable installation. Furthermore, a plurality of straining projections 9 are provided on the lower surface of the peripheral portion of the bottom wall 6d of the guide casing 6 so as to define straining grooves 10 which have a width which increases downward and which remove foreign objects which would otherwise be drawn into the liquid suction opening 7s. The lower end surfaces of the straining projections 9 are located above the lower end surfaces of the support legs 8. Therefore, when the submersible aerator is placed on an installation surface, the lower end surfaces of the straining projections 9 do not come into contact with the installation surface, and a clearance M is left between the lower end surfaces of the straining projections 9 and the installation surface. The support legs 8 and the straining projections 9 are integrally formed on the lower surface of the peripheral portion of the bottom wall 6d of the guide casing 6, and sloping surfaces are provided on the upper surface 6o of the top wall of the guide casing 6 between the air-liquid discharge passages 6r, such that the sloping surfaces are inclined downward and the width thereof increases from the radially inner ends toward the radially outer ends thereof.

The invention claimed is:

1. A submersible aerator including an impeller which is rotated by a motor and draws air and liquid simultaneously from different locations so as to mix the air and the liquid at a peripheral edge of the impeller, wherein a boss portion of the impeller is attached to an end of a motor shaft extending downward from the motor and penetrating into an air chamber; an intermediate plate having an air suction opening at the center thereof is attached to a top wall of a guide casing such that the intermediate plate faces an upper surface of a peripheral portion of a circular main plate of the impeller extending radially outward from the boss portion; a suction cover having a liquid suction opening at the center thereof is attached to a bottom wall of the guide casing such that the suction cover faces lower end surfaces of blades of the impeller; a plurality of guide vanes are provided on an upper surface of the suction cover such that a clearance is left between the guide vanes and a peripheral edge of the impeller; guide passages defined between the guide vanes guide an air-liquid mixture discharged from the impeller to air-liquid discharge passages of the guide casing, whereby the air-liquid mixture is jetted outward through the air-liquid discharge passages; an air chamber communicating with an air conduit extending downward from the atmosphere above a liquid into which the guide casing is immersed is provided above the guide casing in order to introduce air from the atmosphere above the liquid into which the guide casing is immersed; the impeller, which is rotated by the motor, is accommodated within the guide casing such that the impeller can rotate between a lower surface of the intermediate plate and the upper surface of the suction cover; the plurality of blades are provided on the main plate of the impeller such that the blades project toward the upper surface of the suction cover with a predetermined clearance left therebetween, and radially inner ends of the blades face the liquid suction opening, whereby liquid passages are defined between the blades such that the liquid passages communicate with the liquid suction opening and extend radially outward; a groove is provided in each blade such that the groove extends from the periphery of the boss portion of the impeller toward the periphery of the impeller so as to define air passages which communicate with the air chamber, which extend radially outward, and which are open at radially outer ends thereof; the blades have partition walls which separate the liquid passages and the air passages from each other; and the liquid passages and the air passages meet through communication portions at the radially outer ends of rear-side blade partition walls, which are partition walls of the blades which are located rearward with respect to the rotational direction of the motor and which do not receive pressure.

2. A submersible aerator as claimed in claim 1, wherein, adjacent to the communication portions, which connect the liquid passages and the air passages at the radially outer ends of the rear-side blade partition walls of the impeller, intermediate blades project from the main plate such that the intermediate blades extend radially inward from the radially outer edge of the impeller so as to divide each liquid passage into two, the intermediate blades having a height smaller than a height of the blades; the radius of an imaginary circle which connects the radially inner ends of lower end surfaces of the intermediate blades is equal to or less than the radius of an imaginary circle which connects the radially outer ends of the rear-side blade partition walls where the communication portions are provided; the radially inner edges of the intermediate blades are gently inclined such that the radius of an imaginary conical surface connecting the radially inner edges of the intermediate blades decreases gradually toward the lower surface of the main plate; and an attachment angle of the intermediate blades is determined such that the intermediate blades become substantially parallel to front-side blade partition walls, which are partition walls of the blades which are located frontward with respect to the rotational direction of the motor and which receive pressure.

3. A submersible aerator as claimed in claim 1, wherein a conical space is defined between the lower end surfaces of the blades of the impeller and the upper surface of the suction cover, which faces the lower end surfaces, such that the vertical dimension of the space, which is relatively large at an inlet portion adjacent to the liquid suction opening, decreases gradually toward a radially outward region including the radially inner ends of the guide vanes.

4. A submersible aerator as claimed in claim 1, wherein, on a lower surface of a peripheral portion of the bottom wall of the guide casing, a plurality of support legs are provided so as to support the weight of the submersible aerator and enable stable installation, and a plurality of straining projections are provided so as to define straining grooves which have a width which increases downward and which remove foreign objects which would otherwise be drawn into the liquid suction opening; lower end surfaces of the straining projections are located above lower end surfaces of the support legs, so that, when the submersible aerator is placed on an installation surface, the lower end surfaces of the straining projections do not come into contact with the installation surface, and a clearance is left between the lower end surfaces of the straining projections and the installation surface; and the support legs and the straining projections are integrally formed on the lower surface of the peripheral portion of the bottom wall of the guide casing.

5. A submersible aerator as claimed in claim 1, wherein sloping surfaces are provided on an upper surface of the top wall of the guide casing extending from the periphery of the submersible aerator, such that the sloping surfaces are located between the air-liquid discharge passages and such that the sloping surfaces are inclined downward and increase in width from radially inner ends toward radially outer ends thereof.

* * * * *